US006968395B1

(12) United States Patent
Lee

(10) Patent No.: US 6,968,395 B1
(45) Date of Patent: Nov. 22, 2005

(54) PARSING MESSAGES COMMUNICATED OVER A DATA NETWORK

(75) Inventor: William S. Lee, Plano, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/428,808

(22) Filed: Oct. 28, 1999

(51) Int. Cl.[7] ............................ G06F 9/45; G06F 15/16
(52) U.S. Cl. ...................................... 709/246; 717/143
(58) Field of Search ................................ 709/201, 202, 709/230, 236, 246; 455/466; 717/143, 117

(56) References Cited

U.S. PATENT DOCUMENTS 5,966,663 A * 10/1999 Gleason ...................... 455/466

OTHER PUBLICATIONS

Method for Parsing and Arbitrary Hierarchical Data Stream, Feb. 1, 1978, IBM TDB, NN78023679.*

M. Handley, et al., *SIP: Session Initiation Protocol*, RFC 2543, pp. 1-153 (Mar. 1999).

* cited by examiner

Primary Examiner—Paul H. Kang
(74) Attorney, Agent, or Firm—Trop, Pruner & Hu, PC

(57) ABSTRACT

A method and apparatus of parsing a message including a string of characters comprises defining at least one character as a delimiter and setting a starting indicator and a closing indicator. A portion of the string between the starting and closing indicators is collected by a parser method, the portion including at least one delimiter character. The delimiter character is ignored by the parser method so that the portion (the token) of the string may be extracted in its entirety. Additional starting and closing indicators may be nested, with the parser method recursively calling itself with each encounter of a new nested starting indicator.

30 Claims, 6 Drawing Sheets

PARSING MESSAGES COMMUNICATED OVER A DATA NETWORK

BACKGROUND

The invention relates to parsing messages communicated over a data network.

Packet-based data networks are widely used to link various nodes, such as personal computers, servers, gateways, and so forth. Networks include private networks, such as intranets including local area networks and wide area networks, and public networks, such as the Internet. The increased availability of such data networks has improved accessibility among nodes coupled to the data networks. Popular forms of communications across such data networks include electronic mail, file transfer, web browsing, and other exchanges of digital data.

With the increased capacity and reliability of data networks, voice communications over data networks have become possible. Voice communications over packet-based data networks are unlike voice communications in a conventional public switched telephone network (PSTN), which provides users with dedicated, end-to-end circuit connections for the duration of each call. Communications over data networks, such as IP (Internet Protocol) networks, are performed using packets that are sent in bursts from a source to one or more destination nodes. Voice data sent over a data network share the network bandwidth with conventional non-voice data (e.g., electronic mail, file transfer, web access, and other traffic).

In addition to voice communications over data networks, other forms of communications are also possible, such as video conferencing and distribution of multimedia data. Various standards have been proposed to handle and control such communications over data networks. For example, a multimedia data and control architecture has been developed by the Internet Engineering Task Force (IETF). The protocols that are part of the IETF multimedia data and control architecture include the Resource Reservation Protocol (RSVP), as described in Request for Comments (RFC) 2205, for reserving network resources; the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Announcement Protocol (SAP) for advertising multimedia sessions by multicast; the Session Description Protocol (SDP), as described in RFC 2327, for describing multimedia sessions; and the Session Initiation Protocol (SIP), as described in RFC 2543, which establishes, maintains, and terminates multimedia sessions or calls. Such audio or multimedia sessions or calls may include multimedia conferences over the Internet, telephone calls over the Internet, and multimedia distribution (such as by multicast) over the Internet.

To establish, control, and terminate such communications sessions using the above protocols, messages are exchanged between participants and intermediate systems interconnecting the participants. Such messages are in some type of predetermined syntax. For example, SIP is a text-based protocol that uses a predetermined syntax for its messages, which may be exchanged to initiate communications sessions as well as to invite members to participate in a session.

The syntax defined for the messages typically include delimiters to separate portions of a string of characters. Thus, a string in the message may include a number of tokens (each token including one or more characters) separated by the predefined delimiters. Standard delimiters may include quotes, semicolons, brackets, parentheses and others. However, a string of characters may be complicated by the fact that within certain pairs of delimiters, other delimiter characters may be present. Such other delimiter characters may either be nested delimiters, for example, or they may be characters not intended to be delimiters. Such nesting of delimiter characters complicates parsing of messages, especially if it is desired to extract entire tokens that include such delimiter characters.

A need thus exists for improved parser engines and methods for messages that are communicated over data networks.

SUMMARY

In general, according to one embodiment, a method of parsing a message containing a string of characters some of which are set as delimiters includes setting one of the delimiters as a starting constraint and setting another one of the delimiters as a closing constraint. Characters in the string between the starting and closing constraints are identified as being part of a token and any delimiter character between the starting and closing constraints is treated as a non-delimiter.

Some embodiments of the invention may include one or more of the following advantages. Flexibility is enhanced in extracting tokens from a string of characters within a message since certain delimiter characters may be turned on while others turned off. Thus, delimiter characters that have been turned off may be treated as non-delimiters while the delimiters that are on can be used to extract one or more tokens within the string of characters. The design of a parser can be simplified using parser methods and apparatus according to some embodiments.

Other embodiments and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. Although reference is made to messages associated with various protocols, further embodiments may be employed for processing messages according to other protocols or standards.

Figure 1:
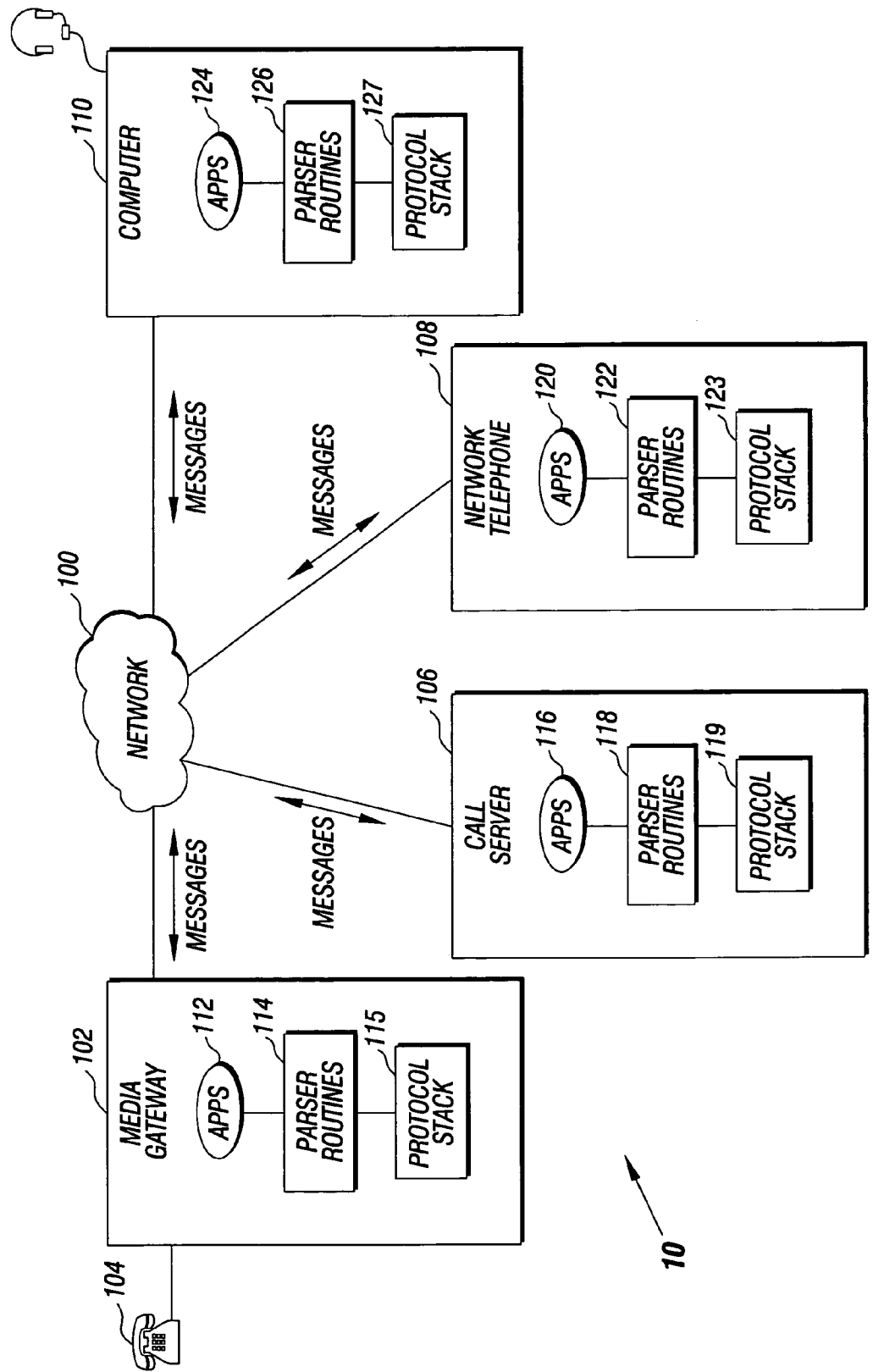
FIG. 1 is a block diagram of an embodiment of a communications system having a plurality of network nodes that can exchange messages with each other, such as messages used to establish, maintain, and terminate audio or multimedia communications sessions.

Referring to FIG. 1, a communications system 10 includes a data network 100 that is coupled to various network nodes. The data network 100 may be a packet-based network such as an Internet Protocol (IP) network. A packet-based network is one in which communications is based on exchange of packets or datagrams. IP is described in Request for Comments (RFC) 791, entitled "Internet Protocol," dated September 1981. In other embodiments, other types of packets may be employed. As used here, a "network" may refer to one or more communications networks, channels, links, or paths.

In one example embodiment as illustrated in FIG. 1, audio (e.g., voice) and multimedia (e.g., audio and video) communications may occur over the network 100 between or among the various nodes, including a computer 110 having voice processing capabilities, a network telephone 108 (which is basically a telephone with network access capabilities), and a media gateway 102 to which non-network telephones 104, such as analog telephones, digital handsets, key system hand sets, or fax machines, may be coupled. The media gateway 102 basically converts regular telephone voice signals into voice packets for transmission over the data network 100, and converts received packets into voice signals to transmit to the non-network telephones.

One or more call servers 106 may also be coupled to the network 100 to process call requests from the various network nodes. Some tasks that may be performed by the call server 106 includes managing policy for incoming and outgoing call routing and managing a subscriber and network directory. Other nodes that are capable of participating in communications sessions may also be coupled to the network 100.

The network nodes include various software application routines or modules (112, 116, 120, and 124) for performing tasks associated with establishing, maintaining, and terminating communications sessions. In addition, each network node may implement a protocol or a suite of protocols for performing audio or multimedia communications over the data network 100. One such suite of protocols provided by the Internet Engineering Task Force (IETF) is the IETF multimedia data and control architecture includes the Session Initiation Protocol (SIP), a version of which is described in RFC 2543 entitled "SIP: Session Initiation Protocol," dated August 1999. SIP may be used to initiate communications sessions as well as to invite members to sessions that may have been advertised by some other mechanism, such as electronic mail, news groups, web pages, and others. The other protocols in the IETF multimedia and control architecture include the Resource Reservation Protocol (RSVP), as described in RFC 2205, for reserving network resources; the Real-Time Transport Protocol (RTP), as described in RFC 1889, for transporting real-time data and providing quality of service (QoS) feedback; the Real-Time Stream Protocol (RTSP), as described in RFC 2326, for controlling delivery of streaming media; the Session Announcement Protocol (SAP) for advertising multimedia sessions by multicast; and the Session Description Protocol (SDP), as described in RFC 2327, for describing multimedia sessions. The protocols described are merely examples of protocols that may be used for communications sessions between network nodes. In further embodiments, other types of protocols may be used, such as protocols for communications sessions other than voice or multimedia communication sessions.

To implement the various protocols, protocol stacks 115, 119, 123 and 127 are included in the media gateway 102, call server 106, network telephone 108, and computer 110, respectively. The various protocol stacks define the syntax and content of messages exchanged over the network 100 to provide the desired communications over the data network 100. As used here, a "message" may refer to a request, response, or any other types of information that may be exchanged between nodes over the network 100.

In one embodiment, messages (such as those associated with SIP) use a syntax in which delimiters are defined to identify different portions (referred to as tokens) of the message. A message may include multiple lines each including a string of characters, and each character may include a text character or a non-text symbol. A string of characters refers to a sequence or other arrangement (not necessarily in sequence) of characters having a predefined beginning and ending. Each string of characters includes one or more tokens that are separated by delimiters.

Tokens in the messages may represent elements used to establish and terminate communications sessions and to carry communicated data in such sessions. The tokens, for example, may represent user names, uniform resource locators (URLs), methods, and so forth.

With some protocols, a relatively complex parsing problem may be encountered. For example, delimiters such as quotes, semicolons, colons, parentheses, brackets, braces, and so forth, may be nested within each other. Further, in some cases, characters that otherwise may be interpreted as delimiters are used as part of a token and not intended as a delimiter. For proper parsing of the text messages, such delimiter characters should not be parsed as delimiters. As used here, a "delimiter character" includes both a character that is used as a delimiter as well as a character that is the same as a delimiter but not intended to be used as a delimiter. Also, to obtain a desired token, some delimiters that are nested within other delimiters may need to be ignored. In accordance with some embodiments of the invention, indicators may be used to turn on and off certain delimiters. Thus, delimiters or delimiter characters that are turned off can be ignored, while delimiters that are on can remain active. A delimiter character that is "ignored" or turned off is treated as a regular non-delimiter character.

In one example, a first set of delimiters may be defined to identify a string portion (a token). The token may contain a second delimiter which needs to be ignored to properly extract the desired token. To do so, the second delimiter in the token is turned off so that the parser engine can ignore the second delimiter. A similar technique may be employed to ignore delimiter characters in the token that are not intended to be used as delimiters. For example, the symbol > may be used as a delimiter in one context but as a greater than sign in another context.

Indicators to turn delimiters on or off may be referred to as constraints. Starting and closing constraints are defined at the beginning and end, respectively, of a portion of a string so that any delimiter character occurring within the portion is ignored. This allows a single token between the constraints to be returned in its entirety even though delimiter characters may be present. A delimiter that is set as a constraint is referred to as a constrained delimiter.

Figure 2:
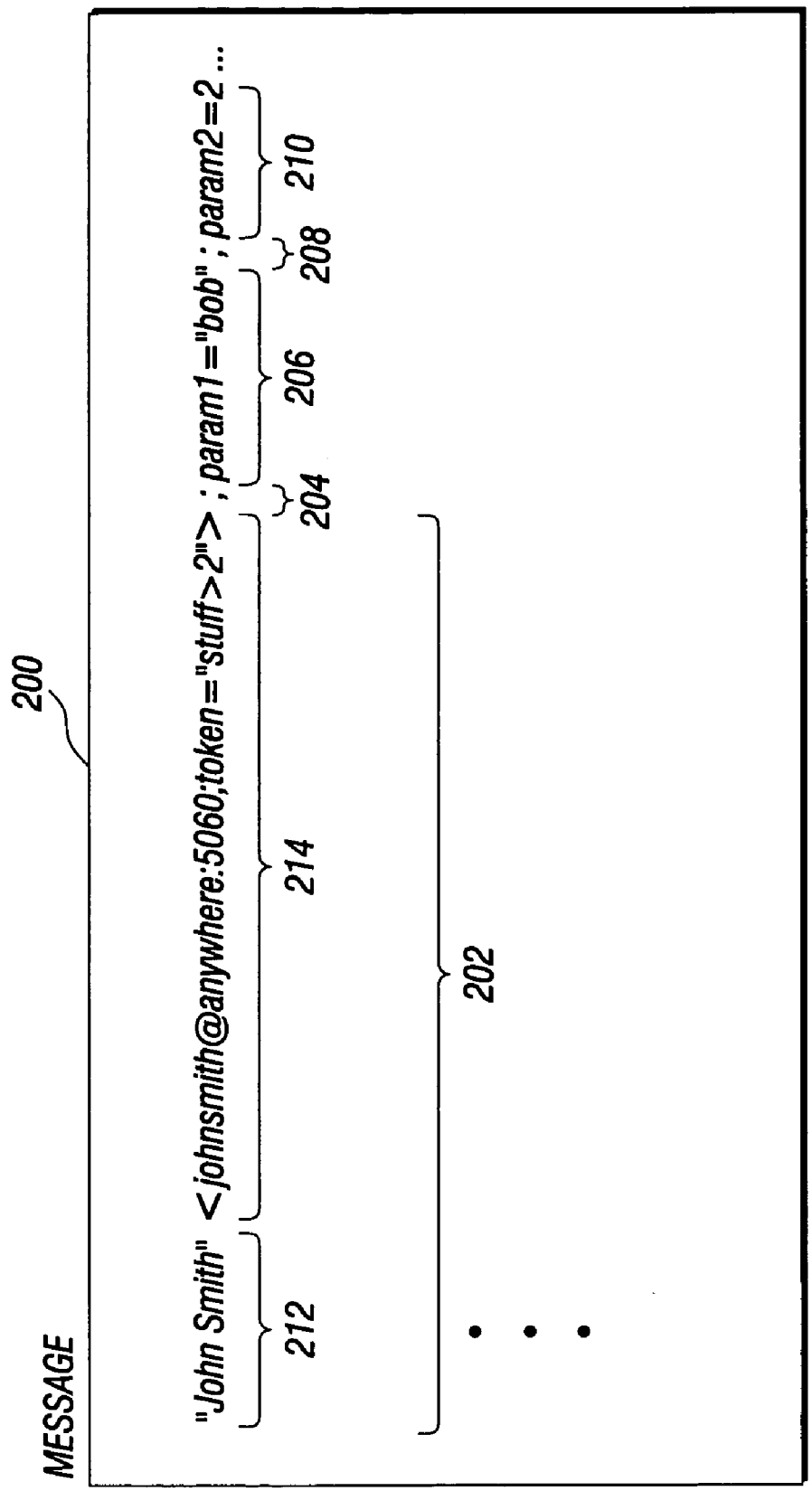
FIG. 2 illustrates an example message including a string of characters with delimiters that separate tokens within the string of characters.

Referring to FIG. 2, an example string in a message 200 is illustrated. The string includes several components, including tokens 212, 214, 206, and 210, which are separated by delimiters 204 and 208. In the example message 200, the token 212 represents a user name, the token 214 represents an address specification, and the tokens 206 and 210 are parameters. Collectively, the user name token 212 and address specification token 214 may be a name address token 202. Note that the example is intended for illustration purposes and does not necessarily conform to the syntax of any protocol.

In the example of FIG. 2, the main delimiter includes the semicolon character (;). The tokens that may be extracted from the string in the message 200 include the tokens 202, 206, and 210, illustrated in the following table, which are delimited by the semicolon characters 204 and 208:

TABLE 1

| "John Smith" <johnsmith@anywhere:5060; token = "stuff>2"> param1 = "bob" param2 = 2 |
| --- |

A parser engine in accordance with some embodiments may be invoked to extract the tokens 202, 206, and 210 out of the text string in the example of FIG. 2. The parser engine may parse the string of characters to produce the desired tokens. As used here, each parser engine may include both hardware and software components. The software components of such engines may be referred to as methods or routines. Thus, for example, a parser engine may include a parser method or routine.

To ensure that the token 202 is properly extracted, the parser method is passed two pairs of constraints, that is, two starting constraints are set and two closing constraints are set. The starting constraints are the characters " and <, and the closing constraints are the characters " and >. Thus, any delimiter characters occurring within " " or < > is ignored in token 202. To extract the tokens 206 and 208, calls to the parser method can be made, with the starting and closing constraints including "and ".

The retrieved token 202 may then be parsed further to break the token 202 into its individual pieces 212 and 214. To identify the tokens 212 and 214, the characters " " and < > are set as delimiters. As shown in FIG. 2, the delimiter characters ; and " are present within the token 214, which is delimited by delimiters < and >. In accordance with some embodiments, if < is set as the starting constraint and > is set as the closing constraint, any delimiter characters within the delimiters < > are ignored so that the whole token 214 may be extracted.

However, in the token 214, a > character used as a greater than sign is also present between quotes. Because of the possibility of the presence of such delimiter characters, both the delimiters " and < are set as starting constraints and the delimiters " and > are set as ending constraints in a call to the parser method. This ensures that the whole token 214 is extracted as a single token despite the presence of other delimiter characters in the token, such as the semicolon and quote delimiters and the character > (which is used as a greater than sign).

Thus, for the example token 214, the goal is to parse through the characters within delimiters < > or collection into a desired token. When the parser method encounters the starting constraint <, it passes through the rest of the character string and collects characters into the token 214 until the parser method reaches the first " character, at which time it has encountered a nested starting constraint. When a nested starting constraint is encountered, a recursive call is made to another instantiation of the parser method to process the new starting constraint. The second instantiation of the parser method then looks for an end quote, which is the ending constraint that matches the nested starting constraint. Additionally, the delimiter character > is encountered (which is used in this context as a greater than sign and not as a delimiter) between the quotes. However, because the characters " " have been set as starting and ending constraints, the delimiter character > is ignored until the parser method encounters the closing constraint. Thereafter, the recursively called second instantiation of the parser method returns, at which point the first instantiation of the parser method processes the next character, which in this case is the closing constraint >. At this point, the token 214 has been identified.

Figure 3:
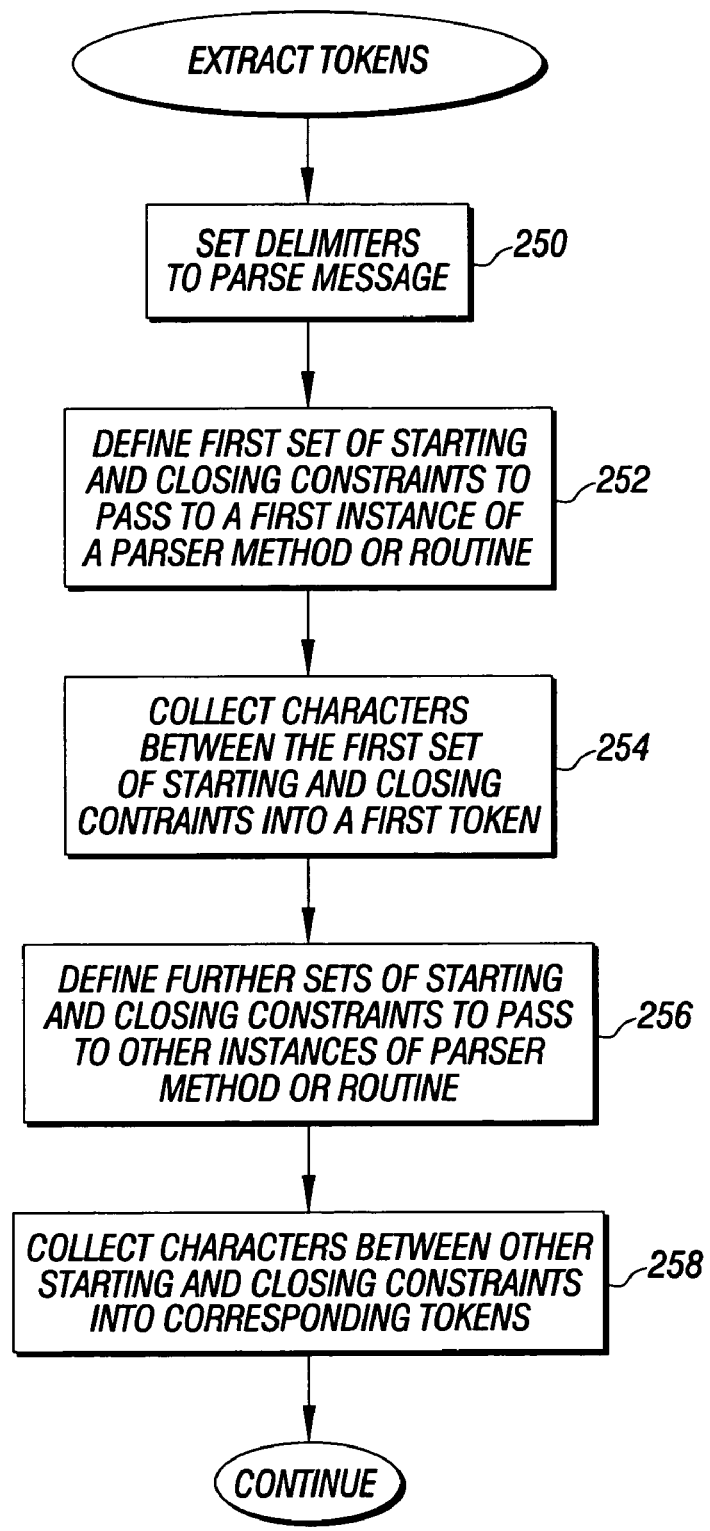
FIG. 3 is a flow diagram of a process for extracting tokens from a message according to one embodiment.

Referring to FIG. 3, a process of extracting tokens from a message is illustrated. The message may include a plurality of strings, and a plurality of delimiters may be set (at 250) to parse a received message, which may be an SIP message in one example. To extract a first token, a first set of starting and closing constraints may be defined (at 252). The first set of starting and closing constraints may include a single pair of starting and closing constraints or multiple pairs of nested starting and closing constraints. The starting and closing constraints may be passed as parameters in a call to a first instance of a parser method or routine. If nested constraints are passed, the parser method or routine may recursively call itself with each encounter of a nested constraint. Next, the parser method or routine may collect characters (at 254) between the first set of starting and closing constraints into a first token.

To process further strings in the received message, further calls of other instances of the parser method or routine may be made. In such further calls, further sets of starting and closing constraints may be defined (at 256) and passed to the other instances of the parser method or routine. The other instances of the parser method or routine may then collect (at 258) characters defined between the further sets of the starting and closing constraints into corresponding tokens.

Thus, the parser engine in accordance with some embodiments processes through portions of a message and sets different pairs of starting and closing constraints as the different portions of the message are being processed. Each pair of starting and closing constraints turns off any delimiter occurring between the pair of starting and closing constraints. Characters between the different pairs of starting and closing constraints are collected into respective tokens.

Figure 4:
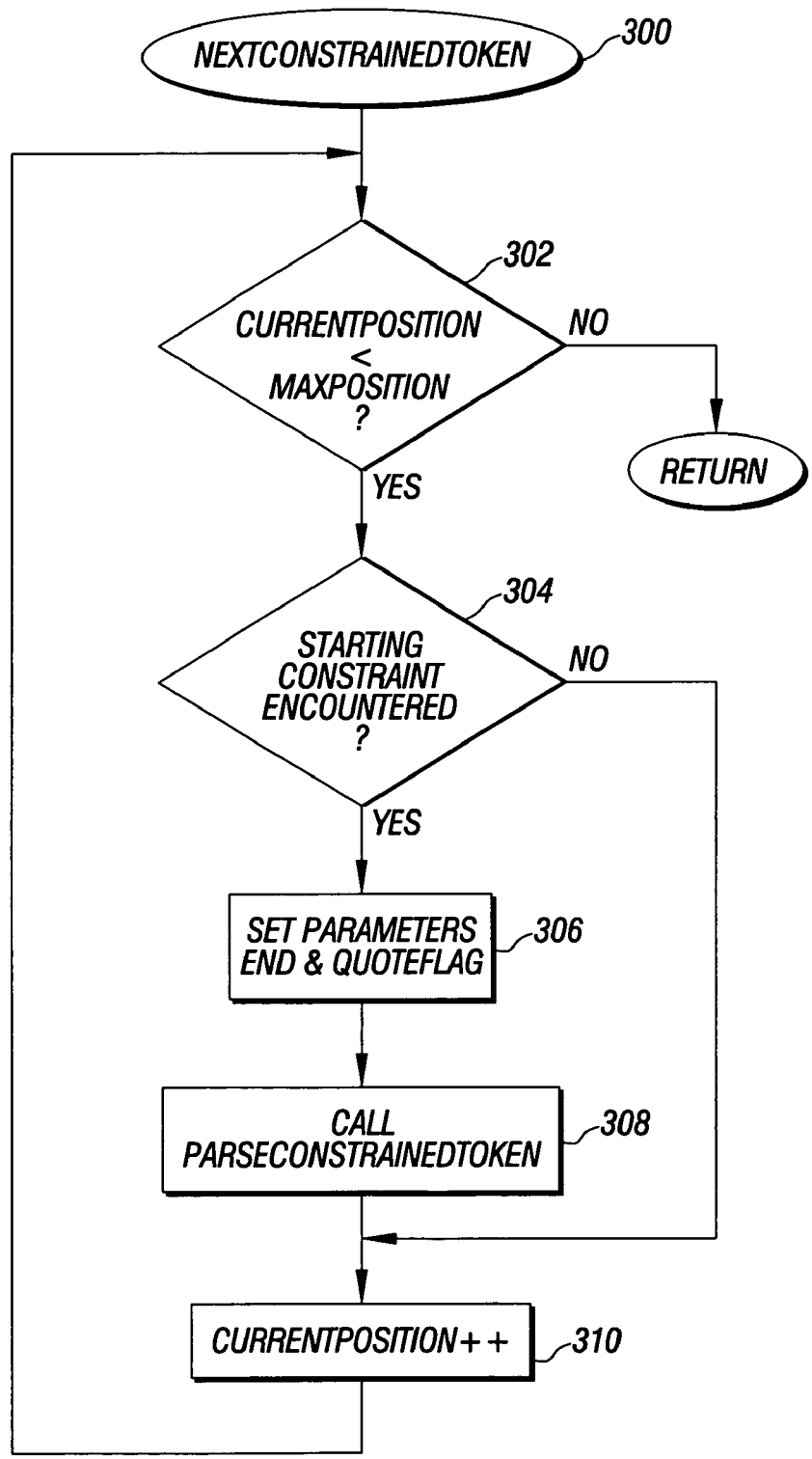
FIGS. 4 and 5 are flow diagrams of routines for parsing messages in accordance with one embodiment.

Referring to FIG. 4, the flow of a parser method 300 (referred to as the NextConstrainedToken method) in accordance with one embodiment is illustrated. Two strings are passed to the NextConstrainedToken method: StartConstraints (which may include one or more starting constraints), and StopConstraints (which may include one or more closing constraints). The multiple starting and closing constraints may be nested within each other. In the NextConstrainedToken method, two parameters are set, a parameter CurrentPosition defined to represent the current position in a string of characters that the method is processing. Another parameter MaxPosition represents the maximum position of the string or substring (that is, the end of the string or substring).

The method 300 determines (at 302) if CurrentPosition is less than MaxPosition. If not, then the end of the string or substring has been reached and the method 300 returns. However, if CurrentPosition is less than MaxPosition, the method determines (at 304) if a starting constraint has been encountered. If not, the parameter CurrentPosition is incremented (at 310) to process the next character in the string.

If a starting constraint was encountered (as determined at 304), the method sets various parameters, including a parameter End and a parameter QuoteFlag. The parameter End is the closing constraint that is matched to the starting constraint and marks the end of the substring where all delimiters have been ignored. The parameter QuoteFlag indicates if the starting constraint is a quote. In one embodiment, nesting of constraints within quotes is not allowed, since a starting quote and ending quote in some embodiments are the same character. For nesting of constraints to continue, starting and closing constraints must be different. Thus, nesting of constraints is possible if they are within unique starting and closing constraints.

Next, a method 400 (referred to as a ParseConstrainedToken method) is called (at 308) by the parser method 300 to parse the substring between the starting and closing constraints, with the parameters End and QuoteFlag passed with the call.

Figure 5:
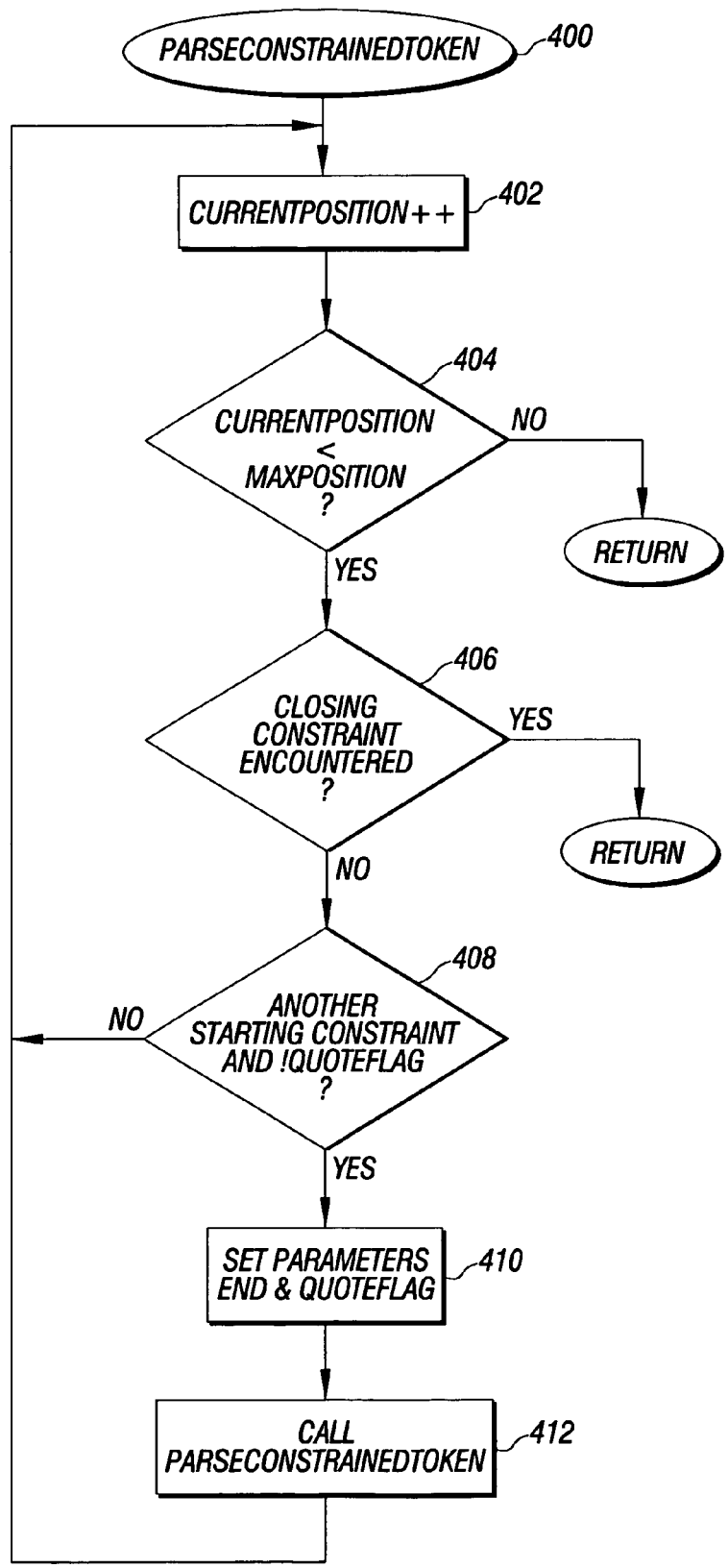
Figure 6:
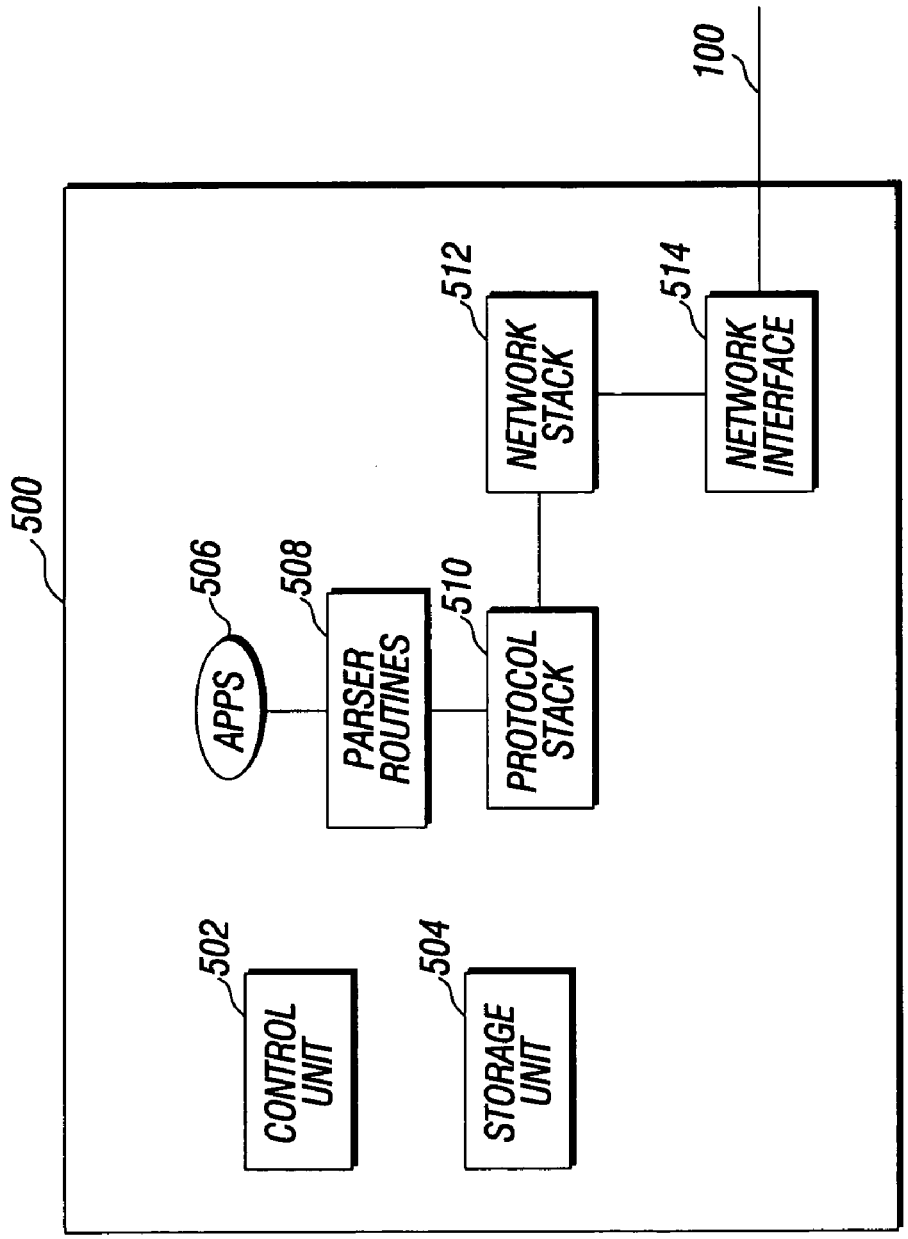
FIG. 6 is a block diagram of an example network node in the communications system of FIG. 1.

Referring to FIG. 5, the ParseConstrainedToken method (400) is illustrated. Since the ParseConstrainedToken method was called due to an encounter of a starting constraint character, the parameter CurrentPosition is incremented (at 402) to process the next character in the string. The ParseConstrainedToken method then determines (at 404) if the parameter CurrentPosition is less than the parameter MaxPosition. If not, the end of string or substring has been reached and the ParseConstrainedToken method returns. However, if the parameter CurrentPosition is less than MaxPosition, then the ParseConstrainedToken method determines if a closing constraint (that matches the parameter End) has been encountered (at 406). If so, the substring within the pair of constraints has been identified and the ParseConstrainedToken method returns to the NextConstrainedToken method.

However, if the closing constraint has not been encountered, the ParseConstrainedToken method determines (at 408) if another starting constraint (a nested starting constraint) has been encountered and the QuoteFlag is false. The parameter QuoteFlag being true indicates that the original starting constraint includes the quote character ", which does not allow further nesting of constraints. As noted above, for nesting of constraints to continue, the starting and closing constraints must be unique. If a starting constraint was not encountered or the original starting constraint is the character ", the CurrentPosition parameter is incremented (at 402) to process the next character in the string or substring. If a nested starting constraint has been encountered and it is not the character "(at 408), the ParseConstrainedToken method sets the parameters End and QuoteFlag (at 410) and recursively calls the ParseConstrainedToken method (at 412). This recursive calling within the ParseConstrainedToken method is repeated with each new encounter of further nested starting constraints. The recursively called ParseConstrainedToken methods return upon detection of corresponding closing constraints.

Referring again to the example of FIG. 2, the NextConstrainedToken method is called to extract the token 214 in its entirety. The StartConstraints string includes " and <and the StopConstraints string includes " and >. When the NextConstrainedToken method encounters the character <, the method has encountered a first constraint. The parameter End is then set equal to the corresponding closing constrained character > and the parameter QuoteFlag is set false.

The ParseConstrainedToken method is then called, which parses through the token 214 until it encounters a nested starting constrained character ". At this point, the ParseConstrainedToken method sets a new End parameter to equal the nested closing constrained character " and sets the parameter QuoteFlag true. A second instantiation of the ParseConstrainedToken method is then called, which parses through the substring within the constraints " and ". The delimiter character > within the quotes is ignored since the quotes are also set as constraints. Upon encountering the nested closing constraint ", the second instantiation of the ParseConstrainedToken method returns to the first instantiation of the ParseConstrainedToken method. When the first instantiation of the ParseConstrainedToken method encounters the closing constrained character >, the method returns to the NextConstrainedToken method.

Parser methods and apparatus have been described in which a desired token that contains delimiter may be extracted by turning the delimiters off. This is accomplished by setting starting and closing indicators (also referred to as constraints) which are used to indicate if certain delimiters are turned on or off. Such starting and closing indicators may be nested to allow proper parsing of complex strings where various delimiter characters (whether intended as delimiters or not) may be contained in the token to be extracted. Nested starting and closing indicators are handled by recursively calling a parsing method.

Referring to FIG. 5, example components of network nodes in the communications system 10 in accordance with one embodiment are illustrated. A network node (referred to generally as node 500) includes software routines or modules such as application routines 506, tokenizer and parser routines 508, protocol stack layers 510, network stack layers 512, and a network interface 514 for interfacing to a link in the network 100. In one example, the network stack 512 may be a TCP/IP (Transmission Control Protocol/Internet Protocol). The protocol stack 510 may be a stack of layers that provide for certain types of communications over the network 100, such as audio or multimedia communications. An example protocol stack may include the protocols provided by the IETF multimedia and control architecture.

The various software routines or modules may be executable on a control unit 502, and instructions or data may be stored in a storage unit 504. The control unit 502 may include a microprocessor, a microcontroller, a processor card (including one or more microprocessors or controllers), or other control or computing devices. The storage unit 504 may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; an optical media such as compact disks (CDs) or digital video disks (DVDs). Instructions that make up the various software routines or modules in the node 500 may be stored in the storage unit 504. The instructions when executed by the control unit 502 cause the node 500 to perform programmed acts.

The instructions of the software routines or modules may be loaded or transported into the node 500 in one of many different ways. For example, code segments or instructions stored on floppy disks, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments or instructions to the node 500. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of parsing a message containing strings of characters, comprising:
   defining a plurality of delimiters;
   setting a first pair of delimiters as first starting and closing indicators to turn off any delimiter occurring in a first string between the first starting and closing indicators;
   setting a second pair of delimiters as second starting and closing indicators to turn off any delimiter occurring in a second string between the second starting and closing indicators; and
   collecting characters in the first and second strings between respective first and second starting and closing indicators into respective tokens.

2. The method of claim 1, further comprising setting at least another pair of delimiters as further starting and closing indicators.

3. The method of claim 1, wherein setting the first and second pairs of delimiters include passing the pairs of delimiters as parameters in corresponding calls to a parser routine.

4. The method of claim 1, further comprising setting another pair of delimiters as further starting and closing indicators and nesting the further starting and closing indicators between the first starting and closing indicators.

5. The method of claim 4, providing the nested starting and closing indicators to turn off a delimiter character that is the same character as one of the first starting and closing indicators between the nested starting and closing indicators.

6. The method of claim 1, wherein collecting the characters contained in the message comprises collecting the characters contained in a Session Initiation Protocol message.

7. The method of claim 1, wherein parsing the message comprises parsing a message for establishing an audio communications session.

8. A method of parsing a message including a string of characters, comprising:
   setting a first pair of constraints to turn off any delimiter occurring within the first pair of constraints;
   setting a second pair of constraints nested between the first pair of constraints to turn off any delimiter occurring within the second pair of constraints; and
   collecting at least a portion of the string of characters between the first pair of constraints.

9. The method of claim 8, wherein the second pair of constraints is set to turn off any delimiter character that is the same character as one of the first pair of constraints between the second pair of constraints.

10. The method of claim 8, further comprising setting one or more pairs of constraints nested between the second pair of constraints.

11. The method of claim 8, wherein parsing the message comprises parsing a Session Initiation Protocol message.

12. A system capable of communicating messages over a network, comprising:
   an interface unit adapted to receive a message including a plurality of characters from the network, some of the characters being delimiters; and
   a parser engine adapted to parse the message by defining a plurality of sets of starting constraints and closing constraints and extracting corresponding tokens including characters between corresponding sets of starting and closing constraints, the parser engine adapted to treat any delimiter between each set of starting and closing constraints as a non-delimiter.

13. The system of claim 12, wherein the parser engine includes a parser routine, the parser engine adapted to define a further set of starting and closing constraints nested between a first set of starting and closing constraints, wherein the parser routine is adapted to recursively call itself when the parser routine encounters a nested starting constraint.

14. The system of claim 12, wherein the message is according to a predetermined syntax.

15. The system of claim 14, wherein the predetermined syntax includes a syntax according to a Session Initiation Protocol.

16. An article including one or more machine-readable storage media containing instructions for processing a message including a string of characters, some of the characters being defined as delimiters, the instructions for causing a system to:
   set one of the delimiters as a starting constraint;
   set another one of the delimiters as a closing constraint;
   identify characters in the string between the starting and closing constraints as being part of a token; and
   treat any delimiter character between the starting and closing constraints as a non-delimiter.

17. The article of claim 16, wherein the one or more machine-readable storage media contain instructions for causing a system to further nest second starting and closing constraints between the first starting and closing constraints and treat any delimiter character between the second starting and closing constraints as a non-delimiter.

18. The article of claim 17, wherein the one or more machine-readable storage media contain instructions for causing a system to further nest starting and closing constraints within the second starting and closing constraints.

19. The article of claim 16, wherein the one or more machine-readable storage media contain instructions for causing a system to process the message according to a Session Initiation Protocol.

20. A method of parsing strings of characters, comprising:
   setting predefined characters as delimiters;
   calling a first instance of a routine and passing a first starting indicator and a first closing indicator, the first instance of the routine processing a first string to identify a first token separated by the first starting and closing indicators and turning off any delimiter character between the first starting and closing indicators; and
   calling at least another instance of the routine and passing at least one other starting indicator and one other closing indicator, the at least another instance of the routine processing at least one other string to identify at least one other token separated by the at least one other starting and closing indicators and turning off any delimiter character between the at least one other starting and closing indicators.

21. The method of claim 20, further comprising passing further starting and closing indicators in the call of the first instance of the routine, the further starting and closing indicators nested between the first starting and closing indicators.

22. The method of claim 21, further comprising the routine recursively calling itself if the further starting indicator is encountered after detection of the first starting indicator.

23. The method of claim 20, wherein the parsing the strings of characters comprises parsing the strings of characters in a Session Initiation Protocol message.

24. Apparatus for parsing a message including a string of characters having a plurality of delimiters, the apparatus comprising:
   a control unit; and
   a routine executable on the control unit, the routine adapted to receive a starting constraint including one of the delimiters and a closing constraint including another one of the delimiters to identify a first token, the routine being adapted to process the string of characters by turning off any delimiter character between a pair of starting and closing constraints to identify the first token.

25. The apparatus of claim 24, wherein the parsed message comprises a Session Initiation Protocol message.

26. An article including one or more machine-readable storage media containing one or more code segments containing instructions for processing a message including a string of characters, the instructions when executed causing a system to:
   define a first starting constraint and a first closing constraint;
   define at least one other starting constraint and at least one other closing constraint, the at least one other starting and closing constraints nested between the first starting and closing constraints;
   extract a token including characters within the first starting and closing constraints; and
   treat delimiter characters between the first and at least one other starting and closing constraints as non-delimiters.

27. The data signal of claim 26, wherein the one or more code segments are part of a routine, the one or more code segments containing instructions that when executed cause a system to further recursively call the routine upon encountering a nested starting constraint.

28. The data signal of claim 26, wherein processing the message comprises processing a Session Initiation Protocol message.

29. A method of parsing a message including characters, comprising:
   processing through portions of the message;
   setting different pairs of starting and closing constraints as the different portions of the message are being processed, each pair of starting and closing constraints to turn off any delimiter occurring between the pair of starting and closing constraints; and
   collecting characters between the different pairs of starting and closing constraints into respective tokens.

30. The method of claim 29, wherein parsing the message comprises parsing a Session Initiation Protocol message.

\* \* \* \* \*

UNITED STATES PATENT AND TRADEMARK OFFICE
CERTIFICATE OF CORRECTION

PATENT NO.    : 6,968,395 B1
DATED         : November 22, 2005
INVENTOR(S)   : William S. Lee It is certified that error appears in the above-identified patent and that said Letters Patent is hereby corrected as shown below:

Column 9,
Lines 8 and 43, "A method" should be -- A computer-implemented method --;

Column 12,
Lines 7 and 13, "The data signal" should be -- The article --;
Line 16, "A method" should be -- A computer-implemented method --.

Signed and Sealed this

Twenty-first Day of February, 2006

JON W. DUDAS
*Director of the United States Patent and Trademark Office*